United States Patent
Liu et al.

(10) Patent No.: US 12,476,779 B2
(45) Date of Patent: Nov. 18, 2025

(54) TWO-POINT SAMPLING OPTIMIZATION METHOD AND SYSTEM FOR SINUSOIDAL EXCITATION-BASED FREQUENCY RESPONSE MEASUREMENT

(71) Applicant: XI'AN JIAOTONG UNIVERSITY, Xi'an (CN)

(72) Inventors: Zipeng Liu, Xi'an (CN); Jinjun Liu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 63 days.

(21) Appl. No.: 18/737,573

(22) Filed: Jun. 7, 2024

(65) Prior Publication Data

US 2024/0405963 A1 Dec. 5, 2024

Related U.S. Application Data

(63) Continuation of application No. PCT/CN2022/134754, filed on Nov. 28, 2022.

(30) Foreign Application Priority Data

Dec. 9, 2021 (CN) .......................... 202111501936.9

(51) Int. Cl.
 *G01R 23/02* (2006.01)
 *G01R 13/34* (2006.01)
 (Continued)

(52) U.S. Cl.
 CPC ............ *H04L 7/002* (2013.01); *H04L 7/0334* (2013.01)

(58) Field of Classification Search
 CPC ....... H04L 7/002; H04L 7/0334; G01R 23/00; G01R 23/02; G01R 23/18; G01R 13/34; G01R 13/342; G01R 13/345
 (Continued)

(56) References Cited

U.S. PATENT DOCUMENTS

| 10,578,754 B2 * | 3/2020 | Sun | ................. H02M 7/538 |
| 2024/0393378 A1 * | 11/2024 | Liu | ................. G01R 23/18 |

FOREIGN PATENT DOCUMENTS

| CN | 112232001 A | 1/2021 |
| CN | 112232002 A | 1/2021 |
| CN | 114169174 A | 3/2022 |

* cited by examiner

*Primary Examiner* — Hai L Nguyen
(74) *Attorney, Agent, or Firm* — George D. Morgan (57) ABSTRACT

The present disclosure discloses a two-point sampling optimized method and system for sinusoidal excitation-based frequency response measurement. A plurality of points are sampled at equal intervals within the starting frequency and ending frequency range as initial information, the interpolation error of each sub-frequency band is estimated according to existing sampling information, the sub-frequency band with the largest interpolation error is selected, two new sampling points are added within the sub-frequency band, and the above steps are repeated until the quantity of sampling points reaches the total quantity set by a user; and the user is asked whether new sampling points need to be added, if so, after the user specifies a new quantity of sampling points, the interpolation error of each sub-frequency band is estimated again and sampling continues, otherwise, the sampling ends. The present improves the practicality of a sinusoidal excitation-based frequency response measurement method.

6 Claims, 6 Drawing Sheets

(51) Int. Cl.
*H04L 7/00* (2006.01)
*H04L 7/033* (2006.01)

(58) Field of Classification Search
USPC .......................................... 327/129; 702/75
See application file for complete search history.

TWO-POINT SAMPLING OPTIMIZATION METHOD AND SYSTEM FOR SINUSOIDAL EXCITATION-BASED FREQUENCY RESPONSE MEASUREMENT

CROSS-REFERENCE TO RELATED APPLICATIONS

The application claims priority to Chinese patent application No. 2021115019369, filed on Dec. 9, 2021, the entire contents of which are incorporated herein by reference.

TECHNICAL FIELD

The present disclosure belongs to the technical field of frequency response measurement, and particularly relates to a two-point sampling optimized method and system for sinusoidal excitation-based frequency response measurement.

BACKGROUND

At present, in the analysis and debugging of various types of complex systems, excitation signals of different frequency response measurement methods are divided into only two types: compound excitation signals and sinusoidal excitation signal. The compound excitation signals are mainly suitable for linear systems, otherwise, it will trigger the phenomenon of spectral aliasing and reduce the measurement accuracy. However, the sinusoidal excitation signal have good universality for both linear and nonlinear systems, and therefore, it still plays an irreplaceable role in the frequency response measurement.

Among frequency response measurement methods using sinusoidal excitation, the most conventional frequency sweep method can easily trigger problems with measurement speed or measurement accuracy. For example, if the step size of the measurement is chosen too large, the measurement accuracy cannot be guaranteed; and if the step size is chosen too small, the measurement time will be greatly prolonged. Meanwhile, the data inheritance of the frequency sweep method is not good, which means that it cannot reuse the existing sampling information well. This will reduce the measurement efficiency.

SUMMARY

The technical problem to be solved by the present disclosure is to provide, in response to the above-mentioned deficiencies in the prior art, a two-point sampling optimized method and system for sinusoidal excitation-based frequency response measurement, which can be directly embedded into existing frequency response analyzers without relying on specific hardware, thereby achieving rapid decrease in the overall interpolation error.

The present disclosure adopts the following technical solution:

Provided is a two-point sampling optimized method for sinusoidal excitation-based frequency response measurement. The interpolation error of each sub-frequency band divided by existing sampling points is estimated according to existing sampling information; the sub-frequency band with largest interpolation error estimated among the sub-frequency bands is selected; two new sampling points are added within the sub-frequency band with largest interpolation error; the above steps are repeated until the quantity of sampling points reaches the preset quantity of total sampling points, the current round of sampling ends; and new sampling points are added and estimation is restarted until sampling ends;

Specifically, the existing sampling information includes initial sampling points and newly added sampling points obtained by subsequent iterative calculation.

Further, $N_s$ points are firstly collected as initial information, then the iteration begins, and each subsequent sampling point is a global optimal point calculated on the basis of the existing sampling information.

Further, the quantity of the total sampling points is greater than or equal to 4.

Specifically, estimating the interpolation error of each sub-frequency band specifically is as follows: constructing triangles by using all the existing sampling points as starting points one by one, and calculating areas of the corresponding triangles to estimate the interpolation errors of all the sub-frequency bands.

Specifically, selecting the sub-frequency band with largest interpolation error estimated among the sub-frequency bands specifically is as follows: comparing all 2N-4 interpolation errors of gain and phase together, selecting the largest value, and determining a corresponding sub-frequency band $[f_i, f_{i+1}, f_{i+2}]$.

Further, the two newly added sampling points are located in $[f_i, f_{i+1}]$ of the sub-frequency band $[f_i, f_{i+1}, f_{i+2}]$ or in $[f_i, f_{i+1}, f_{i+2}]$.

Further, the two newly added sampling points are selected from midpoints or any equidistant point within ranges $[f_i, f_{i+1}]$ and $[f_i, f_{i+1}, f_{i+2}]$.

Specifically, a quantity of the sampling points newly added by the user is even.

Another technical solution of the present disclosure is: a two-point sampling optimized system for sinusoidal excitation-based frequency response measurement, the system including:

an estimation module, estimating the interpolation error of each sub-frequency band divided by existing sampling points according to existing sampling information;

a selection module, selecting the sub-frequency band with largest interpolation error estimated among the sub-frequency bands;

an optimized module, adding two new sampling points within the sub-frequency band with the largest interpolation error;

a sampling module, repeating a process from the estimation module to the optimized module until when the quantity of sampling points reaches the preset quantity of total sampling points, the current round of sampling ends; and a circulation module, adding new sampling points and shifting to the estimation module until sampling ends.

Compared with the prior art, the present disclosure at least has the following beneficial effects:

According to the two-point sampling optimized system for sinusoidal excitation-based frequency response measurement of the present disclosure, the position of each sampling point in frequency response measurement can be optimized, so that distribution of the positions of the sampling points is more reasonable. From the mathematical essence of frequency response measurement, sinusoidal excitation-based frequency response measurement is regarded as frequency domain sampling for the measured system, and the most rapid decrease of the overall interpolation errors are achieved by estimating the interpolation error between the segmented linear interpolation model of existing sampling values and the theoretical model of the measured system, and by placing the two newly added sampling points into the sub-frequency band with largest interpolation error during each iteration.

Further, $N_s$ points are firstly collected as initial information, then the iteration begins, and each subsequent sampling point is the global optimal point calculated on the basis of the existing sampling information. The advantage is that the method always uses each sampling point efficiently, making each point the global optimal result. Unlike commercial frequency sweep method, instead of having all to-be-sampled positions already figured out at the beginning (uniform sampling), the method firstly samples a small quantity of initial points, and then iteratively adds new sampling points gradually based on the information of initial points. Each iteration is calculated using all the existing sampling information to obtain optimal positions of the newly added sampling points.

Further, a minimum of four sampling points is required for the quantity of total sampling points, allowing subsequent iterative calculation to proceed properly. In subsequent iterations, the interpolation errors are compared according to the trapezoidal rule, and this comparison process requires the participation of at least two sub-frequency bands, each sub-frequency band including three sampling points. Assuming that the two sub-frequency bands are adjacent and partially overlap, i.e., the first sub-frequency band is $[f_i,f_{i+1},f_{i+2}]$ and the second sub-frequency band is $[f_{i+1},f_{i+2},f_{i+3}]$, the quantity of total sampling points is at least four.

Further, estimating the interpolation error et of each sub-frequency band specifically is as follows: constructing triangles by using all the existing sampling points as starting points one by one, and calculating areas of the corresponding triangles to estimate the interpolation errors of all the sub-frequency bands. The purpose is to estimate the interpolation error between the sampling values and the theoretical model of the system directly using the trapezoidal rule, provided that the theoretical model of the system is unknown. This estimation is possible because the present disclosure treats sinusoidal excitation-based frequency response measurement as a mathematical interpolation problem, so that interpolation error estimation methods in an interpolation theory, such as the trapezoidal rule, can be directly applied to frequency response measurement. This will help the frequency response analyzers adaptively place newly added sampling points at the position where the interpolation error (i.e., an actual sampling error) is greatest, thereby continuously improving the sampling accuracy.

Further, all 2N–4 interpolation errors of gain and phase are compared together, the largest value is selected, and the corresponding sub-frequency band $[f_i,f_{i+1},f_{i+2}]$ is determined. This is to select the position with the largest interpolation error (i.e., the actual sampling error) in gain and phase. In addition, comparing the gain and the phase together is also intended to achieve global comparison, i.e., the comparison is not just for the gain or the phase, but the sampling information of the gain and the phase is compared at the same time. Obviously, global comparison is more effective in selecting the position with the largest interpolation error.

Further, the two newly added sampling points are located in $[f_i,f_{i+1}]$ of the determined sub-frequency band $[f_i,f_{i+1},f_{i+2}]$ or in $[f_{i+1},f_{i+2}]$. This is due to the fact that the sub-frequency band $[f_i,f_{i+1},f_{i+2}]$ itself contains two smaller sub-frequency bands $[f_i,f_{i+1}]$ and $[f_{i+1},f_{i+2}]$, so it is a natural choice to add two new sampling points directly in a single iteration in order to sample $[f_i,f_{i+1}]$ and $[f_{i+1},f_{i+2}]$ separately. Meanwhile, the method can also allow the two newly added sampling points to be spread out as much as possible so as to sample more information. A counterexample is placing two sampling points too close together, such as placing both points in $[f_i,f_{i+1}]$. While this is also allowed by the algorithm, but it is not the most efficient way.

Further, the two newly added sampling points are selected from midpoints or other equidistant points of $[f_i,f_{i+1}]$ and $[f_{i+1},f_{i+2}]$, this is because these positions are fixed and easy to determine and are common positions for point selection. However, among these point selection strategies, only the midpoint is uniquely determined and therefore has the best data inheritance; and other choices are also possible, but the overall efficiency is reduced. In practice, the midpoint should be preferred.

Further, the new sampling points $N_m'$ are even, this is because the method adds two new sampling points per iteration, so if the user wants to add new sampling points even after the sampling task is over, the quantity $N_m'$ of newly added sampling points must also be even, otherwise the algorithm will make an error.

In summary, the present disclosure has the characteristics of low calculation load, high usability, high accuracy, high stability, and good data inheritance.

The technical solutions of the present disclosure are further described in detail below in conjunction with the accompanying drawings and embodiments.

DETAILED DESCRIPTION OF THE EMBODIMENTS

The present disclosure provides a two-point sampling optimized method for sinusoidal excitation-based frequency response measurement. From the mathematical essence of frequency response measurement, sinusoidal excitation-based frequency response measurement is regarded as frequency domain sampling for the measured system, and the most rapid decrease of the overall interpolation errors are achieved by estimating the interpolation error between the segmented linear interpolation model of existing sampling values and the theoretical model of the measured system, and by placing two newly added sampling points into the sub-frequency band with largest interpolation error during each iteration.

Figure 1:
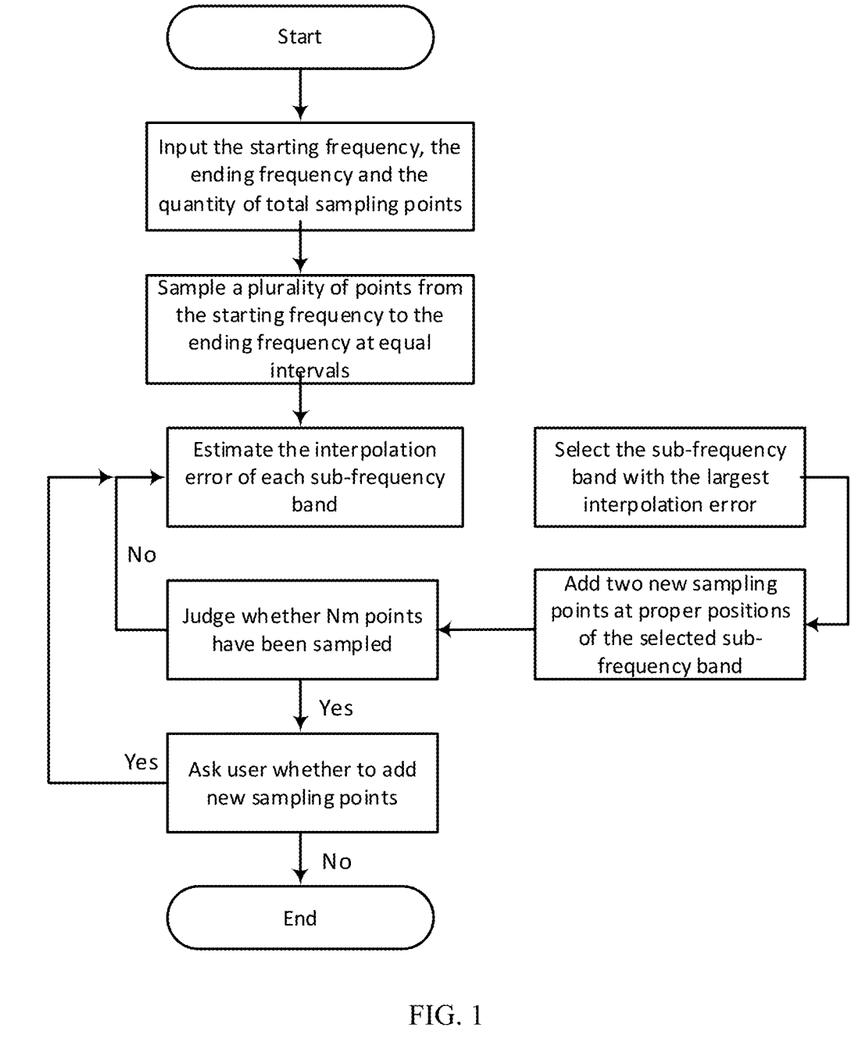
FIG. 1 is a flow diagram according to the present disclosure.

Referring to FIG. 1, a two-point sampling optimized method for sinusoidal excitation-based frequency response measurement includes the following steps:

S1, the sampling starting frequency, the ending frequency and the quantity of total sampling points are set, $N_s$ points are sampled at equal intervals within starting frequency and ending frequency range, and at this time the sampled $N_s$ points will be used as initial information for the start of the iteration; and the sampling starting frequency $f_{start}$, the ending frequency $f_{end}$ and the quantity $N_m$ of total sampling points are three preset parameters necessary for a sampling task, where the starting frequency $f_{start}$ and the ending frequency $f_{end}$ specify a frequency range for sampling, and the quantity $N_m$ of total sampling points specifies a quantity of samples required to sample a target system. The setting of the three parameters completely depends on the measurement requirements and does not require any empirical rules and is therefore very user-friendly. Meanwhile, the quantity $N_m$ of total sampling points must be even and satisfies $N_m \geq 4$.

It is worth noting that the present disclosure will utilize an iterative sampling method, that is, each sampling point is a global optimal point calculated on the basis of existing sampling information. The present disclosure will firstly collect some points as initial information, i.e., $N_s$ points, and then iteration begins; and it also requires that $N_s$ initial sampled points must be sampled at equal intervals, where equally spaced sampling is for sampling the system more uniformly, and $N_s$ is often taken as 4. In practice, these initial sampling points do not need to strictly satisfy equally spaced sampling (equally spaced sampling is only optimal); and a quantity $N_s$ of initial sampling points only needs to satisfy $N_s \geq 4$. The present disclosure is set to 4, i.e., the theoretically permissible minimum value is set. This is also the reason why the quantity $N_m$ of total sampling points must satisfy $N_m \geq 4$.

S2, an interpolation error $e_i$ of each sub-frequency band is estimated according to the existing sampling information, $i=1, 2, \ldots 2N-4$, where N denotes the quantity of points that have been sampled; and The interpolation error is estimated using the trapezoidal rule, i.e., for a sub-frequency band $[f_i, f_{i+1}, f_{i+2}]$ consisting of any three consecutive sampling points, after connecting sampling values to form a triangle, the area of the triangle is approximately equal to three times the interpolation error of the sub-frequency band. The rule is a fairly classical interpolation error estimation method in mathematical principles, so the corresponding mathematical proof is omitted here.

When the trapezoidal rule is applied, triangles are constructed only by using all the existing sampling points as starting points one by one, and areas of the corresponding triangles are calculated, so as to estimate the interpolation error of the corresponding sub-frequency band. It is noted that the interpolation error is essentially a good estimate of a true sampling error. Since there is a total of N sample points, N-2 triangles may be constructed for gain (magnitude) and phase respectively (the last two sample points cannot continue to construct a new triangle), so there is a total of 2N-4 corresponding interpolation errors. Since the calculated values of the areas of these triangles may be positive or negative, all calculated values should be taken as absolute values to reflect the real difference between the sampling values and the theoretical model of system. Meanwhile, since the triangles of the gain (magnitude) and the phase will be compared together, it is also necessary to take relative values of the areas of these triangles, i.e., the relative values are taken with respect to the mean value of the areas of the triangles in the gain (magnitude) and phase, to achieve fair comparison in order of magnitude. If the areas of these triangles are neither calculated by taking the absolute values nor converted to the relative values, in most applications, the interpolation errors of the phase will be absolutely dominant, and thus fair comparison of the gain (magnitude) and phase cannot be achieved. This is because the phase are usually in [−180°, 180°], while the gain (magnitude) may be of quite a small order of magnitude. Therefore, calculation of the absolute values and the relative values of the areas of the triangles is a step that must not be neglected in the present disclosure, which is necessary to achieve the global comparison of the interpolation errors.

It is worth stating that although the method uses the trapezoidal rule in estimating the interpolation error, other similar methods for estimating the interpolation error should also be covered by the scope of protection.

S3, a sub-frequency band $[f_i, f_{i+1}, f_{i+2}]$ with the largest interpolation error is selected, and the corresponding error is max (et); and all 2N−4 interpolation errors of the gain (magnitude) and phase are compared together, so as to select the largest value, and find the corresponding sub-frequency band $[f_i, f_{i+1}, f_{i+2}]$. Obviously, the error of the sub-frequency band is max (et). It should be re-emphasized that the interpolation error of the sub-frequency band is actually a good estimate of the sampling error, so searching for the sub-frequency band corresponding to the largest interpolation error is searching for the sub-frequency band with the largest sampling error.

In addition, there are many algorithms available for searching the maximum value, and this method is not limited to a particular algorithm. Common algorithms, such as a one-by-one comparison method, or a divide-and-conquer algorithm, all can achieve the purpose of finding the maximum value. Since these algorithms are often available in fairly mature commercial toolkits or open source codes, which are not described in detail here.

S4, two new sampling points are added at proper positions within the sub-frequency band; and the two newly added sampling points are located in $[f_i, f_{i+1}]$ or in $[f_i, f_{i+1}, f_{i+2}]$.

The optimal positions of the two sampling points are the midpoints of $[f_i, f_{i+1}]$ and $[f_{i+1}, f_{i+2}]$, i.e., the midpoint of $[f_i, f_{i+1}]$ is sampled at one point, and the midpoint of $[f_{i+1}, f_{i+2}]$ is sampled at the other point.

Of course, the two sampling points do not have to be strictly set as the midpoints, but may also be other fixed positions, such as points of trisection, points of quadrisection or other equidistant points; and selecting as the midpoints here is the most conservative choice. This is because the system itself is unknown and contains a large amount of unsampled information, so the midpoints would be a conservative but stable strategy.

S5, step S2 to S4 are repeated continuously until the quantity N of sampling points reaches the total quantity set by user, i.e., when $N==N_m$ is satisfied, the current round of sampling ends.

N is a count of the quantity of points that have been sampled, N=N+2 is made after each iteration, and whether $N==N_m$ has been satisfied is judged. If the condition has not yet been satisfied, step S2 is started and continues sampling new points; and if the condition has been satisfied, the current round of sampling ends. It should be noted that since two new sampling points are added in each iteration, the present disclosure only needs to carry out $(N_m-4)/2$ iterations to complete one round of sampling task, which will significantly reduce the calculation load.

S6, the user is asked whether new sampling points need to be added, and if yes, step S2 is started after the user specifies a new quantity $N_m'$ of sampling points, otherwise the sampling ends.

The quantity $N_m'$ of newly added sampling points must be even. The present disclosure allows the user to re-input a new quantity $N_m'$ of sampling points at the end of one round of sampling and sampling continues on the basis of all the existing sampling values. This is also known as data inheritance, i.e., for the same system, it is always possible to carry out a new sampling task on the basis of the existing sampling values, and the result of sampling $N_m$ points firstly, and then sampling $N_m'$ points, is exactly the same as the result of directly sampling $N_m+N_m'$ points at the beginning. In practice, the user may not be satisfied with the sampling accuracy after completing a sampling task, and the application of the present disclosure allows the user to continue sampling on the basis of the existing sampling data to continuously improve the sampling accuracy. Moreover, the newly added sampling points still have data inheritance, in other words, the process of adding the sampling points can be continued until the sampling accuracy reaches the user's requirements. A traditional commercial frequency sweep method can only restart the sampling, which will greatly prolong the sampling time and reduce the sampling efficiency.

Figure 2:
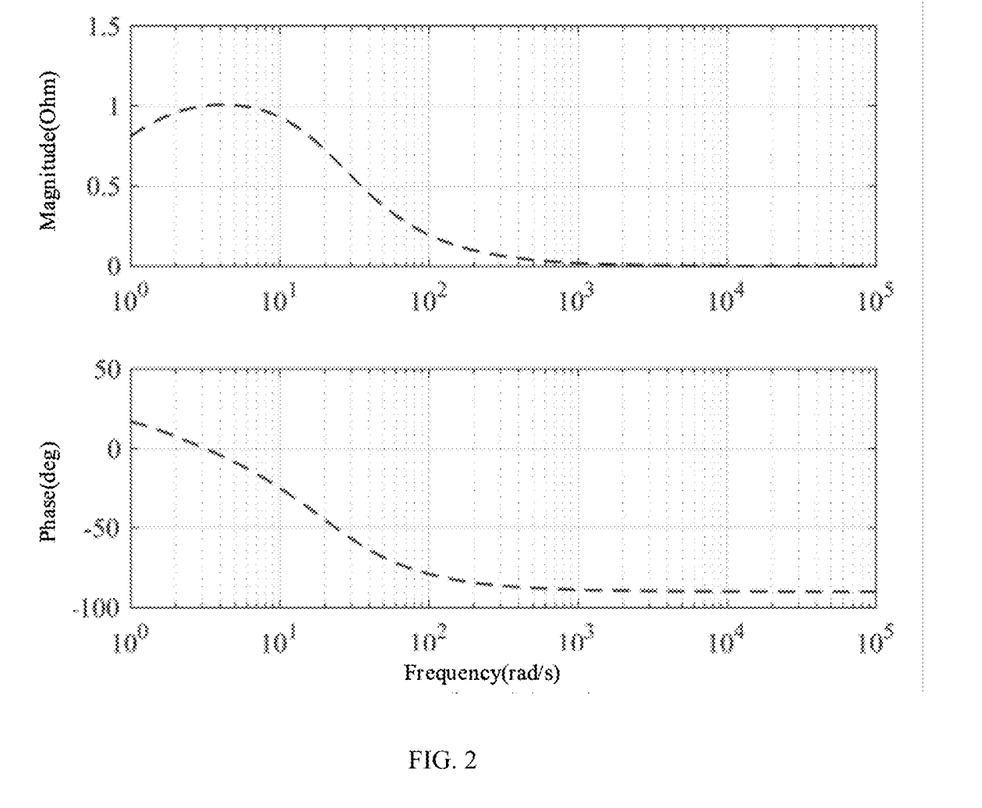
FIG. 2 is a bode diagram of the transfer function of a to-be-measured system in numerical test.

Referring to FIG. 2, FIG. 2 is the bode diagram for supplementary instruction on the transfer function of a to-be-measured system, i.e., the frequency domain characteristic curve of the to-be-measured system. In order to better reflect the advantages and applicability of the present disclosure, the selected bode diagram herein shows more complex variation of curve characteristics, with both flat and straight portions and steeply curved portions.

In a further embodiment of the present disclosure, a two-point sampling optimized system for sinusoidal excitation-based frequency response measurement is provided. The system is capable of being used to implement the above-described two-point sampling optimized method for sinusoidal excitation-based frequency response measurement. Specifically, the two-point sampling optimized system for sinusoidal excitation-based frequency response measurement includes an estimation module, a selection module, an optimized module, a sampling module, and a circulation module.

The estimation module estimates the interpolation error e; of each sub-frequency band divided by existing sampling points according to existing sampling information, i=1, 2, . . . 2N−4, and N is a quantity of sampling points.

The selection module selects the sub-frequency band $[f_i, f_{i+1}, f_{i+2}]$ with the largest interpolation error estimated among the sub-frequency bands.

The optimized module adds two new sampling points within the sub-frequency band $[f_i, f_{i+1}, f_{i+2}]$ with the largest interpolation error.

The sampling module repeats the process from the estimation module to the optimized module until when the quantity N of sampling points reaches the preset quantity of total sampling points, a current round of sampling ends.

The circulation module adds new sampling points $N_m'$ and shifts to the estimation module until sampling ends.

Figure 3:
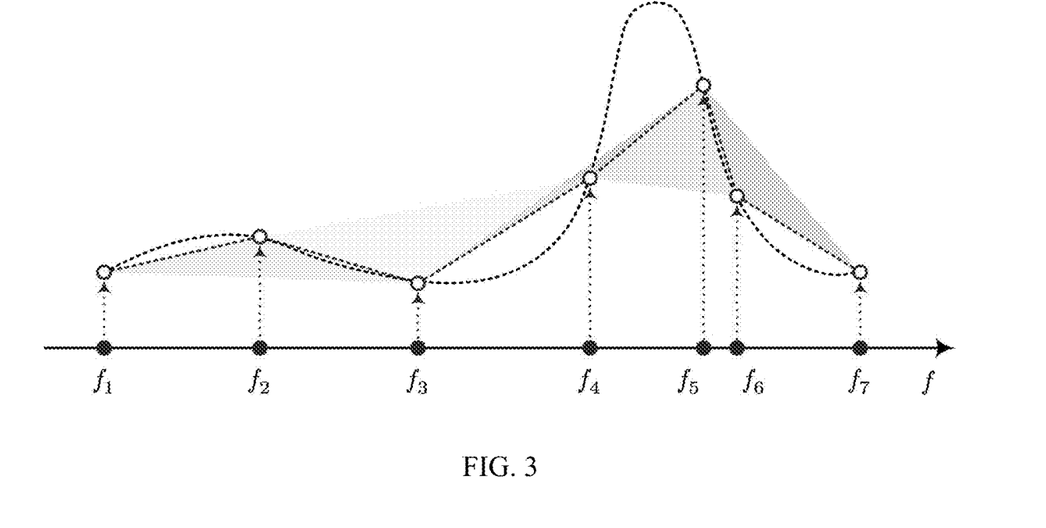
FIG. 3 is a schematic diagram of constructing triangles according to existing sampling information in the present disclosure.
Figure 4:
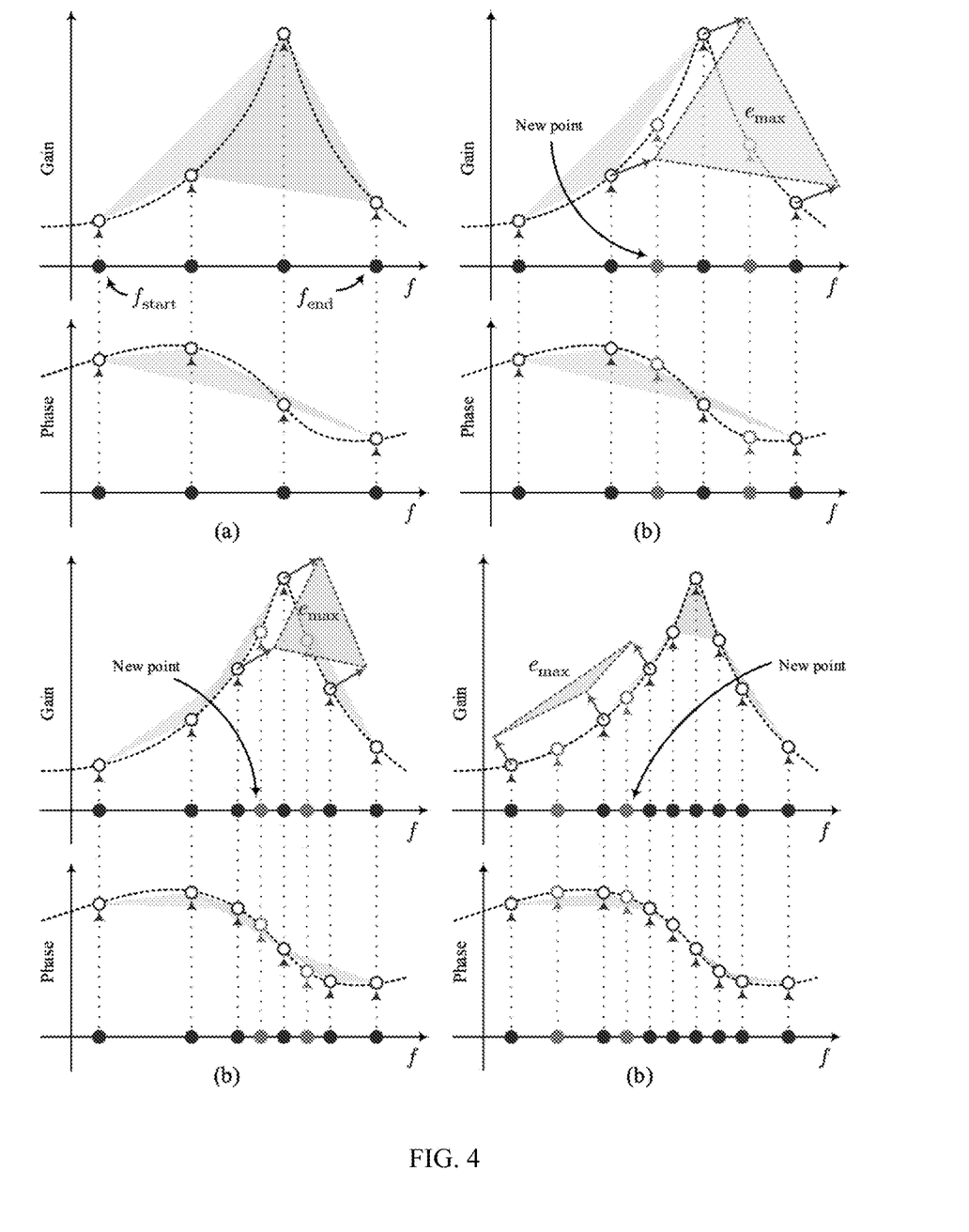
FIG. 4 is an example diagram of sampling process of the two-point sampling optimized method of the present disclosure.
Figure 5A:
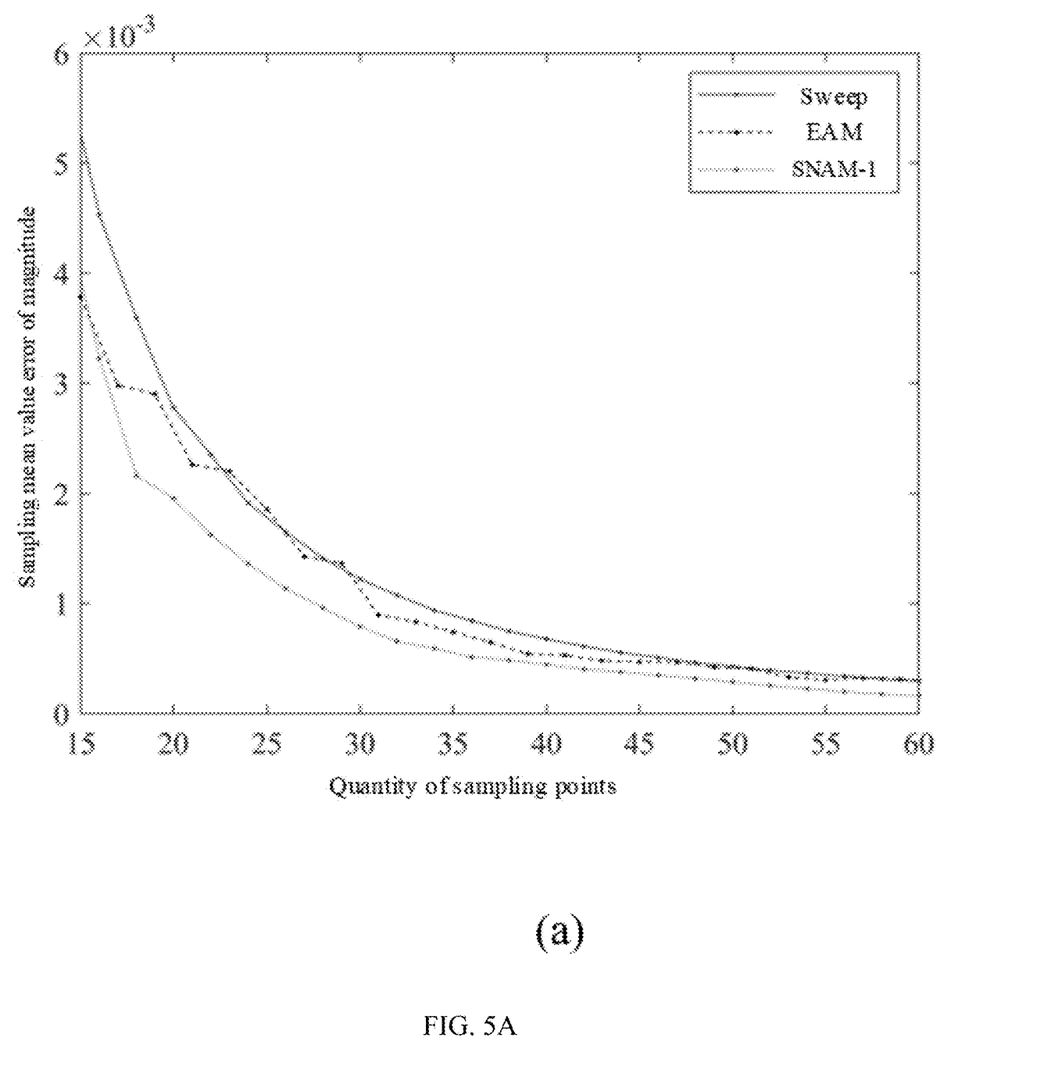
FIGS. 5A and 5B is a comparison diagram of sampling errors of three sinusoidal excitation-based frequency response measurement methods in numerical test.
Figure 5B:
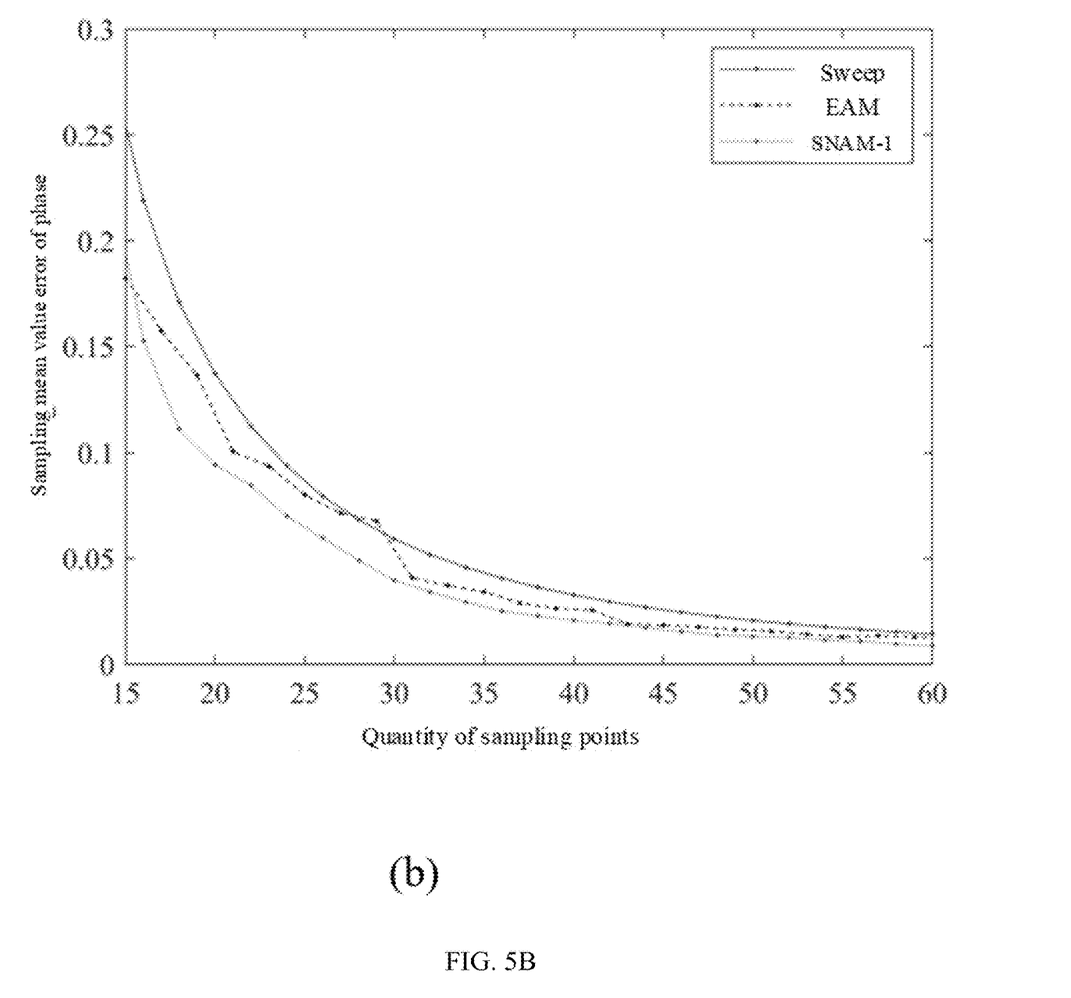

When the method is used, the interpolation errors of all the sub-frequency bands are estimated according to the trapezoidal rule, i.e., triangles are constructed by using all the existing sampling points as starting points, and the areas of the corresponding triangles are calculated, as shown in FIG. 3. Then, the error with the largest relative value is selected from all the estimated errors, the corresponding sub-frequency band is found, and then two new sampling points are added in the sub-frequency band. The sampling process is shown in FIG. 4. When numerical test is performed for the system shown in FIG. 1, the frequency sweep method, the adaptive frequency injection method and the present disclosure are chosen together for test. As can be seen in FIGS. 5A and 5B, the overall error of the three frequency response measurement methods decreases as the quantity of sampling points continues to increase, and the present disclosure always has the lowest error. This proves the effectiveness of the method.

In summary, the two-point sampling optimized method and system for sinusoidal excitation-based frequency response measurement of the present disclosure have the following advantages:

1. The calculation load is low, and each iteration of the method will sample two points, so for $N_m$ sampling points, only $(N_m-4)/2$ interpolation errors need to be estimated.

2. Usability is high, and the method only requires the user to specify the sampling starting frequency, the ending frequency and the quantity of total sampling points, without specifying any other empirical parameters.

3. Accuracy is high, and the method estimates the interpolation error of each sub-frequency band on the basis of the trapezoidal rule, and always adds new sampling points within the sub-frequency band with the largest interpolation error, so that the overall interpolation errors will decrease at almost the fastest rate as the quantity of sampling points increases.

4. Stability is high, and the sampling mechanism of the method ensures that more sampling points always have higher sampling accuracy, so that there will be no stability problem.

5. Data inheritance is good, and the method can always carry out a new sampling task on the basis of all the existing sampling information, so that the sampling efficiency is improved, and good data inheritance is reflected.

The above content is only to illustrate the technical ideas of the present disclosure, and cannot be used to limit the scope of protection of the present disclosure, and in accordance with the technical ideas put forward by the present disclosure, any changes made on the basis of the technical solutions, fall into the scope of protection of the claims of the present disclosure.

What is claimed is:

1. A two-point sampling optimized method for sinusoidal excitation-based frequency response measurement, wherein the two-point sampling optimized method for sinusoidal excitation-based frequency response measurement comprises: estimating the interpolation error of each sub-frequency band divided by existing sampling points according to existing sampling information; selecting the sub-frequency band with the largest interpolation error estimated among the sub-frequency bands; adding two new sampling point within the sub-frequency band with the largest interpolation error; repeating the above steps until the quantity of sampling points reaches the preset quantity of total sampling points, a current round of sampling ends; adding new sampling points and restarting estimation until sampling ends;

wherein the existing sampling information comprises initial sampling points and newly added sampling points obtained by subsequent iterative calculation, $N_s$ points are firstly collected as initial information, and then the iteration begins, and each subsequent sampling point is the global optimal point calculated on the basis of the existing sampling information; and selecting the sub-frequency band with the largest interpolation error estimated among the sub-frequency bands specifically is as follows: comparing all 2N–4 interpolation errors of gain and phase together, selecting the largest value, and determining the corresponding sub-frequency band $[f_i,f_{i+1},f_{i+2}]$, with the two newly added sampling points located in $[f_i,f_{i+1}]$ of the sub-frequency band $[f_i,f_{i+1},f_{i+2}]$ or in $[f_{i+1},f_{i+2}]$.

2. The two-point sampling optimized method for sinusoidal excitation-based frequency response measurement according to claim 1, wherein the quantity of the total sampling points is greater than or equal to 4.

3. The two-point sampling optimized method for sinusoidal excitation-based frequency response measurement according to claim 1, wherein estimating the interpolation error of each sub-frequency band specifically is as follows: constructing triangles by using all the existing sampling points as starting points one by one, and calculating areas of the corresponding triangles to estimate the interpolation errors of all the sub-frequency bands.

4. The two-point sampling optimized method for sinusoidal excitation-based frequency response measurement according to claim 1, wherein the two newly added sampling points are selected from midpoints or any equidistant point within ranges $[f_i,f_{i+1}]$ and $[f_{i+1},f_{i+2}]$.

5. The two-point sampling optimized method for sinusoidal excitation-based frequency response measurement according to claim 1, wherein the quantity of the newly added sampling points is even.

6. A two-point sampling optimized system for sinusoidal excitation-based frequency response measurement, wherein the two-point sampling optimized system for sinusoidal excitation-based frequency response measurement comprises:

an estimation module, configured to estimate the interpolation error of each sub-frequency band divided by existing sampling points according to existing sampling information, wherein the existing sampling information comprises initial sampling points and newly added sampling points obtained by subsequent iterative calculation, $N_s$ points are firstly collected as initial information, and then the iteration begins, and each subsequent sampling point is a global optimal point calculated on the basis of the existing sampling information;

a selection module, configured to select the sub-frequency band with the largest interpolation error estimated among the sub-frequency bands, specifically: selecting the sub-frequency band with the largest interpolation error estimated among the sub-frequency bands specifically is as follows: comparing all 2N–4 interpolation errors of gain and phase together, selecting the largest value, and determining the corresponding sub-frequency band $[f_i,f_{i+1},f_{i+2}]$, with the two newly added sampling points located in $[f_i,f_{i+1}]$ of the sub-frequency band $[f_i,f_{i+1},f_{i+2}]$ or in $[f_{i+1},f_{i+2}]$;

an optimized module, configured to add two new sampling points within the sub-frequency band with the largest interpolation error;

a sampling module, configured to repeat the process from the estimation module to the optimized module until the quantity of sampling points reaches the preset quantity of total sampling points, a current round of sampling ends; and a circulation module, configured to add new sampling points and shift to the estimation module until sampling ends.

* * * * *